SERVO CONTROL SYSTEM

Filed July 30, 1962 3 Sheets-Sheet 1

INVENTORS.
HARRY F. RAYFIELD
GREGORY WILKINSON
RAHMAT A. AZIZ
BY Christie, Parker & Hale
ATTORNEYS.

SERVO CONTROL SYSTEM

Filed July 30, 1962 3 Sheets-Sheet 2

INVENTOR.
HARRY F. RAYFIELD
GREGORY WILKINSON
RAHMAT A. AZIZ
BY Christie Parker & Hale
ATTORNEYS.

SERVO CONTROL SYSTEM

Filed July 30, 1962 3 Sheets-Sheet 3

INVENTORS.
HARRY F. RAYFIELD
GREGORY WILKINSON
RAHMAT A. AZIZ
BY
Christie, Parker & Hale
ATTORNEYS.

United States Patent Office 3,203,635
Patented Aug. 31, 1965

3,203,635
SERVO CONTROL SYSTEM

Harry F. Rayfield, Arcadia, Gregory Wilkinson, Altadena, and Rahmat A. Aziz, San Jose, Calif., assignors to Burroughs Corporation, Detroit, Mich., a corporation of Michigan Filed July 30, 1962, Ser. No. 213,286
16 Claims. (Cl. 242—55.12)

This invention is directed to improvements in servo control systems and more particularly to a novel servo control system for selectively controlling the position of a moving member relative to a reference position.

In many electromechanical systems, it is desirable to control the position of a moving member relative to a particular reference position. The apparatus for electromechanically driving magnetic tape in a tape transport is one such system.

In a tape transport, tape is stored on a supply reel in a storage area and extends from the supply reel through an operational zone under a series of magnetic heads to a take-up reel. To drive the tape through the operational zone the tape transport includes a pair of capstan drive arrangements, one spaced on either side of the operational zone. One of the capstan drives is energized in passing the tape from the supply reel to the take-up reel while the other capstan is energized to drive the tape from the take-up reel to the supply reel.

As is commonly known, magnetic tape is thin and flexible. Thus, in stopping and starting the tape to drive it through the operational zone, care must be taken to insure that the tape is not subjected to excessive longitudinal stresses which might cause undue tape wear or breakage. Generally, to insure tape protection, excess amounts of tape in the form of a tape loop extend between each of the reels and the capstan drives. Accordingly, when the tape is suddenly stopped and started, or suddenly reversed, enough slack is present in the tape to prevent tape breakage.

In stopping and starting the tape, however, the length of the tape loops tend to change—one loop becoming shorter while the other loop becomes longer. Thus, after a period of repeated stop and start operations, one of the tape loops may disappear and allow undue tensioning of the tape to develop, while the other loop may lengthen to a point which tends to foul the operation of the tape transport.

Therefore, in magnetic tape transports, as in other systems including loops of flexible material, it is necessary to control the position of the tape loops relative to a reference position or within a predetermined range of lengths relative to a reference length.

In tape transports this has been accomplished by use of servo control systems which continuously detect variations in the length of the tape loops to control the operation of a pair of drive motors which are connected to the supply and take-up reels respectively. The servo designs presently employed to provide such control, however, are expensive and complex and in operation require a large power supply to continuously energize the reel drive motors.

The present invention, on the other hand, provides a relatively simple, inexpensive, low power consumption servo control system which is particularly useful in controlling the position of tape loops in a tape transport. To accomplish this, the servo control system of the present invention employs a novel combination of an "on-off" type detecting apparatus and a control circuit. The detecting apparatus is arranged to detect predetermined incremental changes in the position of the end of a tape loop from a reference position. The control circuit is responsive to the detection apparatus to block input power to the reel drive motors when the tape loops are within a predetermined desired range of positions about the reference position, to automatically change the direction of driving rotational output of the reel drive motors when the tape loop passes from one side to the other of the reference position, and to periodically excite the reel drive motors for periods of time which are a function of predetermined increments of displacement of the end of the tape loops from the reference position. Such an excitation of the reel motors produces a selective aiding or opposing of the rotational movement of the tape reels and tends to speed or slow the rotation thereof as a function of the displacement of the associated loops from the reference position. In this manner, the length of each tape loop is selectably controlled to maintain the end of each loop adjacent to the reference position.

Briefly, one form of the servo control system providing such position control includes a pair of reel drive motors, one connected to each reel in the tape transport. The motors are each connected to develop a rotational output, the direction of which is determined by the direction of unidirectional current flow through the motor. Connected between each reel motor and a source of alternating current signals are switching means for passing unidirectional current signals through the associated motor in response to control signals applied thereto. To develop the control signals on a predetermined time basis, a light source is positioned on one side of each tape loop. Positioned on an opposite side of the tape loops are a plurality of separate light detecting devices, such as photo cells. The photo cells are physically aligned such that longitudinal movement of the tape, which results in movement of the tape loop in a plane substantially parallel to the photo cells, blocks or passes light to successive ones of each plurality of photo cells. The light source and the plurality of photo cells define one form of on-off type position detecting apparatus.

In this arrangement and for each reel motor, one of the plurality of photo cells defines a reference position for the associated tape loop. This photo cell is responsive to a passing of the end of the tape loop from one side to the other of the reference position to activate circuit means for reversing the direction in which the unidirectional current will flow through the switching means and the reel motor. Only when light passes to a photo cell on one side of the reference photo cell or is blocked from a photo cell on an opposite side of the reference photo cell is a control circuit means activated to generate the control signals which close the switch means—the reel motor being normally blocked from receiving an input signal to conserve on power consumption. The control circuit means, when activated, generates control signals at a frequency which is a function of the number of photo cells to one side or the other of the reference photo cell which are receiving, or blocked from receiving, light from the light source. Thus, in response to the control circuit means, the switching means for each reel motor remains closed during predetermined portions of each half-cycle of the alternating input signal, the time duration of each closure being a function of the displacement of the end of the tape loop from the reference position. In this manner, unidirectional current signals are passed through each reel motor having a time averaged magnitude which is a function of displacement of the end of the associated tape loop from the reference position. The unidirectional current signals, in turn, develop a torque output for each reel motor which is a function of the displacement of the associated tape loop from the reference position to proportionately aid or oppose the rotation of the tape reels and maintain the ends of the tape loop adjacent the reference position.

The above, as well as other features of the present invention, may be more clearly understood by reference to the following detailed description when considered with the drawings, in which.

Figure 1:
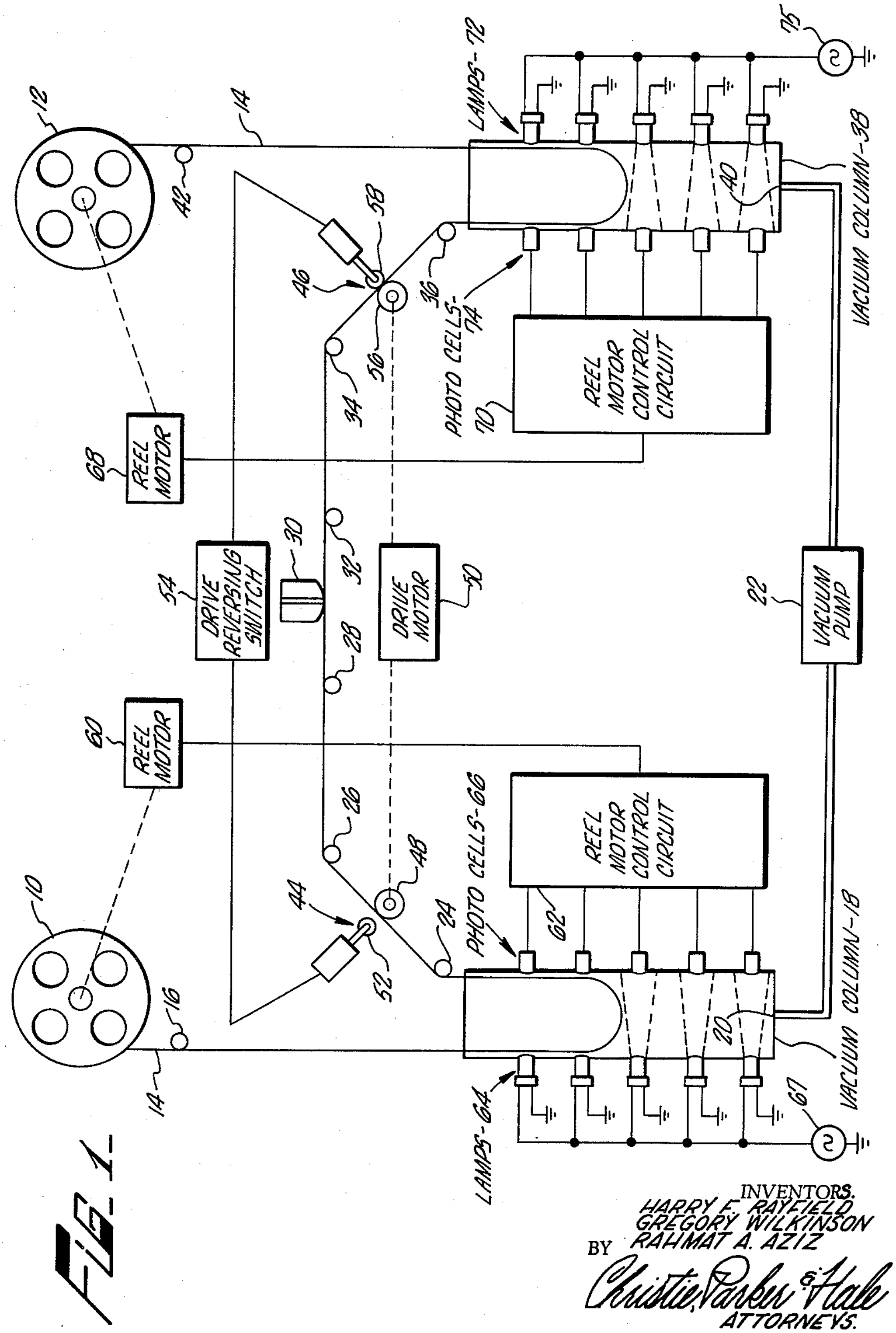
FIGURE 1 is a schematic block diagram representation of a tape transport employing the servo control system of the present invention.

Referring to FIGURE 1, there is represented one form of a tape transport. As illustrated, the tape transport includes a rotatably mounted supply reel 10 and a take-up reel 12. Wound around the supply reel 10 and extending to the take-up reel 12 is a length of magnetic tape 14. The magnetic tape 14 extends from the supply reel 10 over a stationary guide member 16 into a vacuum column 18. The vacuum column 18 is well-shaped and has a port 20 in its lower surface connected to a vacuum pump 22.

The vacuum pump 22 exerts a suction force on the lower surface of the tape 14 within the vacuum column 18 to tend to cause the tape 14 to form a loop within the vacuum column, as illustrated. The vacuum column 18 thus arranged acts as a relatively low inertia storage for tape and functions as a buffer between the means for driving the magnetic tape and the relatively high inertia storage reel 10.

The tape 14 passes from the vacuum column 18 over fixed guides 24, 26 and 28 and under a magnetic head 30. From the magnetic head 30 the tape 14 passes over fixed guides 32, 34 and 36 to a vacuum column 38. The vacuum column 38 is well shaped to receive the tape 14 and has a port 40 in its lower surface coupled to the vacuum pump 22. The vacuum pump 22 exerts a suction force on the lower surface of the tape 14 causing the tape 14 to tend to form a loop within the vacuum column 38 as illustrated. The vacuum column 38 acts as a low inertia storage for tape between the relatively high inertia take-up reel 12 and the means for driving the magnetic tape between the supply reel and the take-up reel.

The tape 14 passes from the vacuum column 38 past a fixed guide 42 to the take-up reel 12.

To selectively drive the magnetic tape 14 between the supply reel 10 and the take-up reel 12, the tape transport includes a pair of capstan drive arrangements illustrated generally as 44 and 46, respectively. The capstan drive 44 includes a capstan roller 48 which is mechanically coupled for rotation to a drive motor 50. The capstan roller 48 is positioned to one side of the magnetic tape 14. Positioned on an opposite side of the magnetic tape 14 is a pinch roller 52. The pinch roller 52 is normally spaced from the surface of the tape 14 and is mounted to make impinging contact therewith to cause the driving rotary movement of the capstan roller 48 to direct the tape from the take-up reel to the supply reel. The pinch roller 52 is controlled from a drive-reversing switch 54 which selectively energizes the capstan drives 44 and 46.

The capstan drive 46 includes a capstan roller 56 coupled for driving rotation to the drive motor 50. The capstan roller 56 is positioned on one side of the magnetic tape 14. Positioned on an opposite side of the magnetic tape 14 is a pinch roller 58. The pinch roller 58 is normally spaced from the surface of the magnetic tape 14 and is mounted to impinge upon the tape to cause the tape to pinch tightly against the capstan roller 56, thereby allowing the capstan roller 56 to drive the tape from the supply reel 10 to the take-up reel 12 as illustrated. Similar to the pinch roller 52, the pinch roller 58 is also selectively energized from the drive reversing switch 54.

As the capstan drives 44 and 46 are selectively actuated to stop and start the magnetic tape 14, the tape loops formed in the vacuum columns 18 and 38 tend to change length. For example, as the tape 14 is driven from the supply reel 10 to the take-up reel 12 and the tape is periodically stopped and started, the tape loop within the vacuum column 38 tends to lengthen while the tape loop within the vacuum column 18 tends to become shorter. Thus, after a period of stop and start operation, the tape loop within the vacuum column 18 may completely disappear to allow excessive longitudinal forces to be exerted on the tape in stop and start operations, while the tape loop within the vacuum column 38 may become of such a length as to possibly foul the operation of the tape transport. In order to prevent such an occurance the servo control system of the present invention is associated with each tape reel.

Briefly, as illustrated in block form, the servo control system associated with the supply reel 10 includes a reel motor 60 which is coupled to drive the supply reel 10 in accordance with control signals generated in a reel motor control circuit 62. The reel motor control circuit 62, in turn, is controlled by an "on-off" type position detecting apparatus comprising, by way of example, a plurality of lamps 64 positioned in one wall of the vacuum column 18 and a plurality of light detecting means such as the plurality of photo cells 66 positioned in an opposite wall of the vacuum column 18. The plurality of lamps 64 are connected to and energized in parallel from a source of A.C. signals 67. Each photo cell is aligned opposite to a lamp such that light from one and only one lamp impinges thereon. The position detecting apparatus detects predetermined incremental changes in the position of the tape loop in the vacuum column 18 from a reference position. The reel motor control circuit 62 is responsive to the detection apparatus to block input power to the motor 60 when the tape loop is within a predetermined range of positions around the reference position and automatically changes the direction of driving rotational output of the reel motor 60 when the tape loop passes from one side to the other of the reference position. In addition, the reel motor control circuit 60 functions in response to the position detecting apparatus to periodically excite the reel motor for periods of time which are a function of the incremental displacement of the tape loop from the predetermined range of positions about the reference position. The periodic excitation of the reel motor 60 produces a selective aiding or opposing of the rotational movement of the supply reel 10 and tends to speed up or slow down the rotation thereof as a function of displacement of the end of the tape loop within the vacuum column 18 from the reference position. In this manner the length of the tape loop within the vacuum column 18 is selectively controlled to maintain the end of the loop adjacent to the reference position.

In a similar manner, the servo control system associated with the supply reel 12 includes a reel motor 68 coupled to impart rotational movement to the take-up reel 12 in response to electrical control signals generated in a reel motor control circuit 70. The reel motor control circuit 70 generates control signals is response to an "on-off" type position detecting apparatus which, by way of example, includes a plurality of lamps 72 positioned in one wall of the vacuum column 38 and a plurality of light detecting devices such as a plurality of photo cells 74 mounted in an opposite wall of the vacuum column 38. The plurality of lamps 72 are connected to and energized in parallel form a source of A.C. signals 75. Each photo cell is aligned with a different lamp such that light from only one lamp is arranged to impinge upon any one photo cell.

Briefly, the position detecting apparatus comprising the lamp 72 and photo cells 74 detect predetermined incremental changes in the position of the tape loop within the vacuum column 38 about a reference position. The reel motor control circuit 70 is arranged to be responsive to the detecting apparatus to block input power from the reel motor 68 when the tape loop is within a predetermined range of positions about the reference position and to automatically change the direction of driving rotational output of the reel drive motor when the tape loop passes from one side to the other of the reference position. In addition, the reel motor control circuit 70 periodically excites the reel motor 68 for periods of time which are a function of the incremental displacement of the tape loop within the vacuum column 38 from the predetermined range of positions about the reference position. The periodic excitation of the reel motor 68 produces a selective aiding or opposing of rotational movement of the take-up reel 12 and tends to speed up or slow down the rotation thereof as a function of displacement of the tape loop from the reference position in the vacuum column 38. In this manner the length of the tape loop within the vacuum column 38 is controlled to maintain a position adjacent to the reference position.

As illustrated in FIGURE 1, and as briefly described above, the servo control system for the supply reel 10 and the servo control system for the supply reel 12 are identical in structure and operation. Accordingly, only the servo control system associated with the supply reel 10 will be described in detail and is illustrated in a preferred form in FIGURE 2.

As represented, the servo control system for the supply reel 10 includes the reel motor 60. The reel motor 60 is coupled to the supply reel 10 and develops a rotational output having a direction which is determined by the direction of unidirectional current flow through an armature 76 of the motor. Thus, depending upon the direction of unidirectional current flow through the motor 60, the rotational output thereof imparts movement to the tape 14 leaving the supply reel 10 which either aids or opposes the longitudinal movement of the tape caused by the capstan drive 46. As will be hereinafter described in detail, such operation of the reel motor 60 either speeds or slows the rotational velocity of the supply reel 10 to maintain the tape loop about a reference position in the vacuum column 18.

To provide such controlled operation the reel motor 60 is illustrated as being a compound motor including a shunt field winding 78 and a series connected field winding 82. The shunt field winding 78 is coupled to a D.C. shunt field source 80. As is commonly known, a compound motor possesses the desirable characteristics of a shunt motor and a series motor. Thus, the motor 60 possesses a high starting torque due to series current flow through the series field winding 78 and has linear torque-speed characteristics.

As represented, the motor armature 76 is shunted by a resistor 84. The resistor 84 has a high wattage rating but a low resistance and functions as a damping resistor when the motor power is turned off. For example, when the motor power is off and the armature 76 is rotating due to its inherent inertia, the motor 60 acts as a generator. The resistor 84 then functions to damp out currents in the overall servo system to prevent the development of undesired oscillations.

To provide means for automatically controlling the direction of unidirectional current flow through the motor 60, the armature 76 and the series field winding 82 are connected in series through a reversing relay, represented generally as 86. The reversing relay includes a first pair of contacts 88 and 90 and a second pair of contacts 92 and 94. The reversing relay armature 96 is coupled to a terminal 100 of the motor armature 76 and is movable between the contacts 88 and 90. The relay armature 98 is coupled to a terminal 102 of the motor armature 76 and is movable between the contacts 92 and 94.

Figure 2:
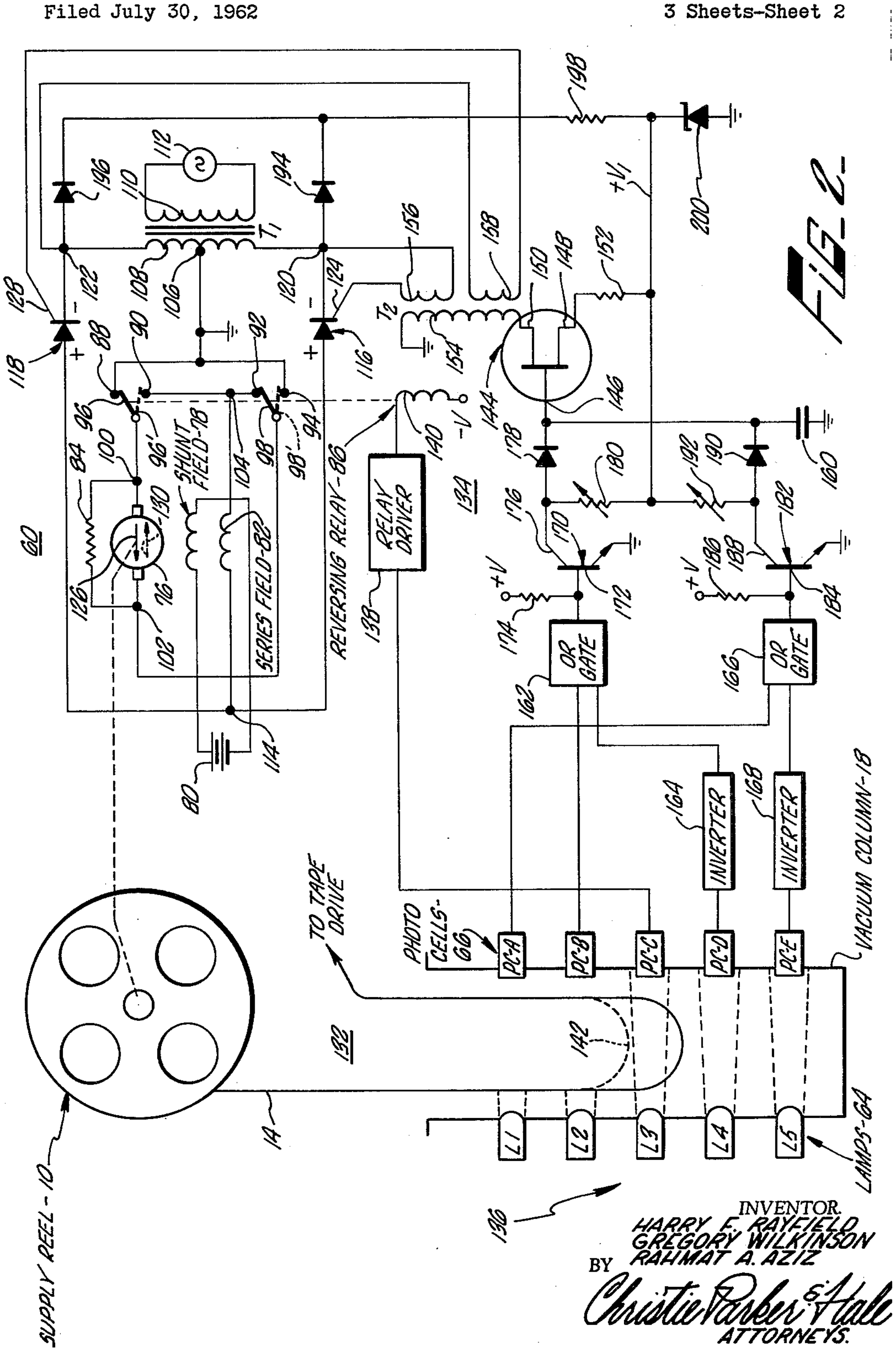
FIGURE 2 is a schematic representation of one form of the servo control system of the present invention.

The reversing relay 86, as shown in FIGURE 2, is in its released state with the armature 96 contacting the relay contact 88 and the armature 98 contacting the relay contact 92. In its activated state, the relay armatures 96 and 98 contact the relay contacts 90 and 94, as represented by the dotted lines 96′ and 98′, respectively.

The relay contacts 90 and 92 are electrically connected to a terminal 104 of the series field winding 82 while the contacts 88 and 94 are connected to ground and to a center tap 106 on the secondary winding 108 of an input transformer $T_1$. The transformer $T_1$ has primary winding 110 coupled to receive an alternating current input signal, such as graphically illustrated in FIGURE 3(*a*) from a source 112.

As illustrated, the remaining terminal 114 of the series field winding 82 is coupled to a pair of normally open unidirectional current conductive switching devices 116 and 118. By way of example only, the switching device 116 is illustrated as being a silicon controlled rectifier having its anode coupled to the terminal 114 of the series field winding 82 and its cathode coupled to a terminal 120 of the secondary winding 108. The switching device 118 is also represented, by way of example, as being a silicon controlled rectifier having its anode coupled to the terminal 114 of the series field winding 82 and its cathode coupled to a terminal 122 of the secondary winding 108 to complete the electrical connection of the motor 60 to the source 112.

The motor armature 76 and the series field winding 82 are thus coupled in series with the alternating current input including the secondary winding 108 of the transformer $T_1$ while the reversing relay 86 operates to selectively reverse the series connection of the field winding 82 and the armature 76. Accordingly, when the reversing relay 82 is in its released state, a series circuit may be traced from the center tap 106 through the relay armature 96, the motor armature 76, the relay armature 98, the field winding 82, the rectifier 118 to the terminal 122 of the secondary winding 108. In addition, a series circuit may be traced from the center tap 106 through the motor armature 76, the field winding 82, and through the rectifier 116 to the terminal 120 of the secondary winding 108. In a similar manner, series circuit connections may be traced from the center tap 106 when the reversing relay is in its activated state.

As is commonly known, a silicon controlled rectifier is a switching device which functions in a manner similar to that of a thyratron. The rectifier is normally in a high impedance or open state to block current flow. To excite a silicon controlled rectifier to pass a current signal the anode of the rectifier must be positive relative to the cathode. In addition a control or gate current signal must be applied to a control electrode of the rectifier to trigger the rectifier. When the above conditions are satisfied the rectifier switches to a low impedance or closed state to pass a current signal. The rectifier then continues to pass the current signal as long as the anode remains positive with respect to the cathode of the rectifier. Thus, in an alternating current signal setting, such as the present invention, when a silicon controlled rectifier is triggered during a first cycle of an A.C. input signal, it passes a current signal for the remaining portion of the half-cycle and switches to its open state at the commencement of the next half-cycle of input signal, for example, when the polarity of the applied voltage reverses. Accordingly, a silicon controlled rectifier is a normally open switch which, when excited, passes a unidirectional current signal.

As represented in FIGURE 2, the silicon controlled rectifiers 116 and 118 are poled in opposite directions relative to the center tap 106. Thus during a first half-cycle of the alternating input signal applied to the transformer $T_1$ the rectifier 116 is forward biased, as indicated, and a control signal applied to its control electrode 124 triggers the rectifier to pass a unidirectional current signal through the motor armature 76. With the reversing relay 86 in a released state, as illustrated, the unidirectional current signal flows through the armature 76 in a direction represented by the arrow 126.

During the same half-cycle of the input signal the rectifier 118 is back biased and hence a control signal applied to its control electrode 128 has no effect. However, during the next half-cycle of the alternating input signal, the polarity of the voltages developed across the rectifiers 116 and 118 are reversed. The rectifier 118 is then forward biased as indicated. Thus, a control signal applied to the control electrode 128 triggers the rectifier 118 to pass a unidirectional current signal through the motor armature 76 also in the direction of the arrow 126.

When the reversing relay 86 is in its activated state the armatures 96 and 98 break contact with the relay contacts 88 and 92 and make contact with the relay contacts 90 and 94, respectively. In this state the direction of unidirectional current flow through the motor armature 76 is reversed as indicated by the dotted line arrow 130.

Thus, the operation of the reversing relay 86, by controlling the series connection of the motor armature 76 and the series field winding 82, controls the direction of unidirectional current flow through the motor. In addition, since the direction of rotation of the motor 60 is determined by the direction of unidirectional current flow through the armature 76, the selective operation of the reversing relay 86 also controls the direction of the rotational output developed by the motor and hence whether the motor 60 is operating to aid or oppose the feeding of tape from the supply reel 10 to the capstan drive 46.

The magnitude of the torque developed by the motor 60 to aid or oppose the rotation of the supply reel 10 is a function of the magnitude of the current passing through the motor armature 76. The time during each half-cycle at which the rectifiers 116 and 118 are excited determines the magnitude of the average unidirectional current flowing through the motor armature 76. Thus, selective control of the reversing relay 86 together with the time during each half-cycle at which the rectifiers 116 and 118 are excited, provides control of both the direction of the rotational output as well as the torque developed by the motor 60 to control the position of the tape loop relative to a reference position within the vacuum column 18.

To provide such automatic control of the operation of the motor 60, the servo control system of the present invention includes a novel combination of an "on-off" type position detecting arrangement 132 and a control circuit 134. Basically, a first part of the position detecting apparatus 132 detects the position of the end of the loop within the vacuum column 18 in relation to one side or the other of a reference position for controlling the reversing relay 86. A second part of the position detecting apparatus 132 detects incremental changes in the displacement of the end of the tape loop from a predetermined range of positions about the reference position and periodically excites the rectifiers 116 and 118 to conduct for periods of time of each conducting half-cycle which is a function of the displacement of the tape loop from the reference position. In this manner, the magnitude of the unidirectional current signal passing through the motor 60 is automatically controlled to be a function of the displacement of the tape loop from the reference position. Thus, both the direction and magnitude of the rotational output developed by the motor 60 are automatically controlled to urge and maintain the end of the tape loop adjacent the reference position.

A preferred form of the position detecting apparatus 132 is illustrated in FIGURE 2, and includes a light source 136 having a plurality of lamps 64 individually represented as L1, L2, L3, L4 and L5. The lamps are mounted in the vacuum column 18 and aligned on one side of the tape loop. Mounted in the vacuum column 18 on an opposite side of the tape loop is a plurality of light detecting devices 66 illustrated as photo cells PC–A, PC–B, PC–C, PC–D and PC–E. Each photo cell is aligned to only receive light from a single lamp. Thus, as illustrated, the photo cell PC–A is arranged to only receive light from the lamp L1, the photo cell PC–B is arranged to only receive light from the lamp L2 and so on. Accordingly, the end of the tape loop, in moving between the lamps 64 and the photo cells 66, blocks light from the successive ones of the photo cells.

By way of example only, the lamp L3 and the photo cell PC–C define the reference position for the tape loop within the vacuum column 18. The photo cell PC–C is coupled to a relay driver 138 which may be a current amplifier. The relay driver 138 is coupled to the coil 140 of the reversing relay 86. The coil 140 is coupled to a source of negative potential −V. When light is blocked from the photo cell PC–C by the tape loop, the reversing relay 86 is in its released state, as illustrated. When the tape loop is in the position as indicated by the dotted line 142 to allow light to pass from the lamp L3 to the photo cell PC–C, the photo cell develops a current signal which is amplified by the relay driver 138 and, in passing through the coil 140, actuates the relay 86. Thus, the photo cell PC–C, in combination with the reversing relay 86 and the lamp L3, defines the first part of the position detecting apparatus 132 and functions to reverse the direction of unidirectional current flow through the motor armature 76 as well as the direction of rotational output developed by the motor 60 when the end of the tape loop passes from one side of the photo cell PC–C to the other, for example, from one side of the reference position to the other.

The photo cells PC–A, PC–B, PC–D and PC–E and the lamps associated therewith define the second part of the position detecting apparatus 132. As previously described, the second part of the position detecting apparatus excites the silicon controlled rectifiers 116 and 118, at a time during each conducting half-cycle of the alternating current input signal which is a function of the displacement of the tape loop from the reference position. This causes the period of time for which the rectifiers are excited, the magnitude of the unidirectional current passed thereby, and the torque output developed by the motor 60 to also vary as a function of displacement of the tape loop from the reference position.

To provide such selective control of the rectifiers 116 and 118, the second part of the position detecting apparatus 132 is coupled to the control circuit 134. The control circuit 134 is responsive to the second part of the position detection apparatus 132 to generate control signals at the control electrodes 124 and 128 of the rectifiers 116 and 118, respectively, at a frequency which varies with changes in the position of the end of the tape loop from the reference position. To generate the control signals the control circuit 134 includes a control device which is illustrated as being an unijunction transistor 144 having a base electrode 146 and a pair of anode electrodes 148 and 150. The anode electrode 148 is coupled to a biasing resistor 152 which is connected to receive a positive potential represented at $+V_1$. The anode electrode 150 is coupled to the primary winding 154 of a transformer $T_2$. The transformer $T_2$ includes a pair of secondary windings 156 and 158. The secondary winding 156 is coupled between the control electrode 124 and the terminal 120 of the transformer $T_1$ while the secondary winding 158 is coupled between the control electrode 128 and the terminal 122 of the secondary winding 108 of the transformer $T_1$. The base terminal 146 of the unijunction transistor 144 is coupled to a capacitor 160. The capacitor 160 is also coupled to ground.

As is commonly known, a unijunction transistor, such as 144, is a normally open solid state switching device which switches into a high conductance or low resistance state when a predetermined voltage is developed between its base terminal 146 and its anode electrode 148. The unijunction transistor, when once switched to a conductive, state, remains in a conductive state until the voltage at the base terminal is removed. Thus, when the capacitor 160 is charged to a predetermined voltage level relative to the value of the voltage $+V_1$ the unijunction transistor switches to a conductive state to allow the capacitor 160 to rapidly discharge through the primary winding 154 of the transformer $T_2$. This develops pulse current signals in the secondary windings 156 and 158, which comprise the control signals. Therefore, by charging the capacitor 160, control signals are developed which selectively excite the silicon controlled rectifiers 116 and 118 to pass unidirectional current signals to the motor 60 as previously described.

In the control system of the present invention to maintain the end of the tape loop about the reference position the timed generation of the control signals is controlled such that the rectifiers 116 and 118 are conductive for periods of time during alternate half-cycles of the alternating input signal which are a function of the displacement of the tape loop from the reference position. To accomplish this, the charging time and periodicity of charging of the capacitor 160 is selectively controlled by the position of the end of the tape loop relative to the reference position. To provide such control of the capacitor 160 each photo cell is coupled to an "OR" gate. As is commonly known, an "OR" gate is a normally open gating circuit which is arranged to pass an electrical signal to its output terminal when an electrical signal of a predetermined polarity is applied to any one of its input terminals. In the present invention, the "OR" gates are arranged to be responsive to current signals passing from the light activated photo cells 66. As illustrated, the photo cell PC–B is coupled to an "OR" gate 162. The photo cell PC–D is coupled through a signal inverter 164 to the "OR" gate 162. In a similar manner the photo cell PC–A is coupled to an "OR" gate 166. The photo cell PC–E is also coupled to the "OR" gate 166 through a signal inverter 168.

The "OR" gate 162 is coupled to a normally closed to ground switch, represented by a transistor 170. The transistor 170, is by way of example, an NPN type transistor which is coupled in a grounded emitter configuration. A base terminal 172 of the transistor 170 is coupled to the "OR" gate 162 and through a biasing resistor 174 to a source of positive potential $+V$. Due to the biasing provided by the source of potential $+V$, the transistor 170 is normally in a conducting state. Thus, its collector terminal 176 is normally at or about ground potential. The collector terminal 176 is coupled through a diode 178 to the base 146 of the unijunction transistor 144 and to a variable resistor 180 which is connected to receive the positive potential $+V_1$.

The "OR" gate 166 is coupled to a normally closed to ground switch represented by the transistor 182. The transistor 182, by way of example only, is illustrated as being an NPN type transistor connected in a grounded emitter configuration. A base terminal 184 of the transistor 182 is coupled to the "OR" gate 178 and through a biasing resistor 186 to a source of positive potential $+V$. Due to the biasing provided by the source of potential $+V$ the transistor 182 is normally maintained in a conducting state such that its collector terminal 188 is normally at or about ground potential. The collector 188 is coupled through a diode 190 to the base 146 of the unijunction transistor 144 and through a variable resistor 192 which is connected to receive the positive potential $+V_1$.

Figure 3:
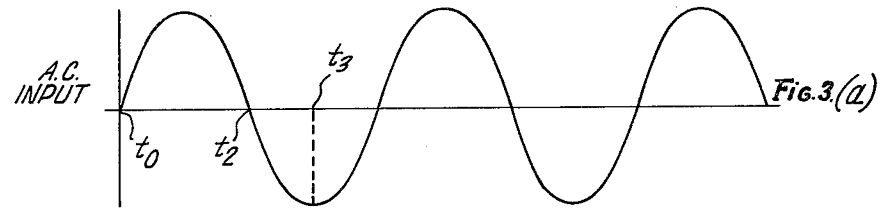
FIGURES 3(*a*)–(*d*) are graphical representations of the waveforms associated with the servo control system illustrated in FIGURE 2.
Figure 3:
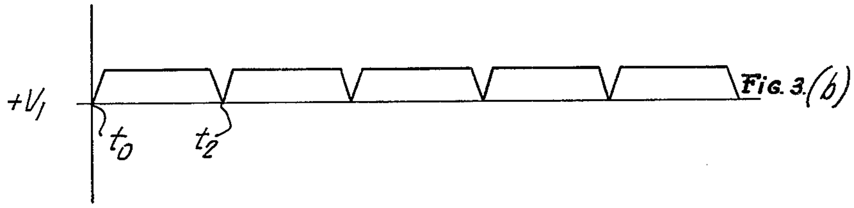
Figure 3:
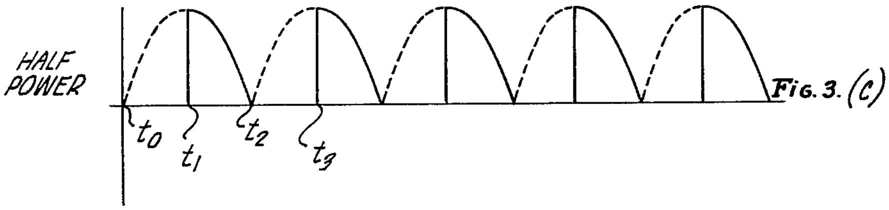
Figure 3:
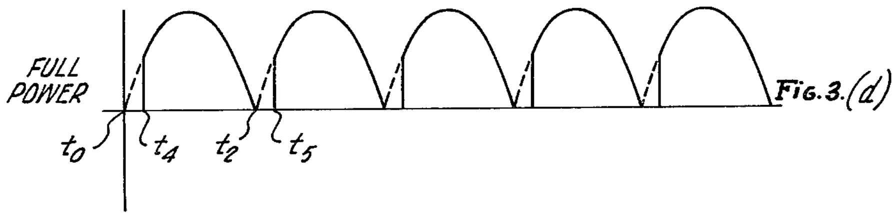

The positive potential $+V_1$ is an amplitude-limited full wave rectified signal version of the input signal applied to the transformer $T_1$. To develop such a voltage a pair of diodes 194 and 196 connected in series opposition between the terminals 120 and 122 of the secondary winding 108 of the transformer $T_1$. A resistor 198 is coupled to a junction of the diodes 194 and 196 while a zener diode 200 is coupled between the resistor 198 and ground. Due to the relative poling of the diodes 194 and 196 a full wave rectified voltage is developed at a junction thereof. The amplitude of the full wave rectified voltage is limited by the zener diode 200 to develop the voltage $+V_1$. In this manner the voltage developed by the source $+V_1$ is in synchronism with the alternating current input signal, having a frequency equal to twice that of the input signal. The waveform of the voltage $+V_1$ is illustrated in FIGURE 3(*b*).

In operation, when the end of the tape loop lies between the photo cell PC–C and either the photo cells PC–B or PC–D, it is said to lie within a desired range of positions about the reference position defined by the photo cell PC–C. In such a range of positions, as illustrated in FIGURE 2, the tape loop allows light to pass to the photo cells PC–D and PC–E. Light passing to the photo cell PC–D produces a current signal which is inverted by the signal inverter 164 to maintain the "OR" gate 162 in its normally open state. In a similar manner, the light striking the photo cell PC–E produces a current signal which is inverted by the signal inverter 168 and passed to the OR gate 166. Since the signal is inverted the OR gate 166 also remains in an open condition.

In this state, the transistor switches 170 and 182 are closed to back bias the diodes 178 and 190 and current flows from the voltage source $+V_1$ through the variable resistors 180 and 192 to ground through the transistor switches 170 and 182, respectively. Thus, when the end of the tape loop is within the predetermined range of positions about the reference position, the capacitor 160 is substantially discharged, the control device 144 is in an inactive or non-conducting state, and the rectifiers 116 and 118 are in their normally open state to block current flow to the motor 60. Since current is blocked from the motor 60 no power is dissipated in the reel motor. In addition movement of the end of the tape loop within the range of positions does not effect the servo control system other than to selectively activate and release the reversing relay 86, when the end of the tape loop passes from one side of the photo cell PC–C (i.e. the reference position) to the other. Accordingly, the reversal of the direction of the rotation output to be developed by the motor 60 occurs when no power is applied thereto thereby increasing the operating life of the reel motor 60 and the reversing relay 86.

Should the tape loop change its position to either pass light to the photo cell PC–B or block light from the photo cell PC–D, however, a current signal is developed at the input of the OR gate 162 which causes the OR gate to pass a current signal to the base 172 of the transistor 170, switching the transistor into a non-conductive state. When this occurs, the transistor switch 170 effectively opens to develop a high resistance at the collector 176. The diode 178 is then forward biased and current passes through the resistor 180 to charge the capacitor 160.

As previously described, as the capacitor 160 charges the voltage developed between the base terminal 146 and the anode terminal 150 increases to the predetermined threshold voltage of the unijunction transistor 144. When this voltage is reached, the capacitor 160 has charged to its perdetermined voltage level and the unijunction transistor switches to its conductive state. The capacitor 160 then rapidly discharges through the primary winding of the transformer $T_2$ to develop the control signals at the rectifiers 116 and 118. When the charge on the capacitor 160 is dissipated the unijunction transistor returns to its normally open state and the capacitor 160 recharges to again excite the unijunction transistor 144 and develop another set of control signals.

The time required to charge the capacitor 160 is determined by the value of the resistor 180 and the capacitor 160. The resistor 180 is variable. Thus, the time required for the capacitor 160 to charge in response to the voltage $+V_1$ applied to the resistor 180 may be varied.

By way of example, the value of the resistor 180 is adjusted such that the capactior 160 is charged to the predetermined voltage level in a period of time slightly less than one-quarter cycle of the alternating current input signal. Thus, if the voltage signal $+V_1$, having a waveform as illustrated in FIGURE 3(*b*), is applied to the resistor 180 at a time $t_0$, the capacitor 160 is rapidly charged, thereby exciting the unijunction transistor 144 to pass control signals to the control electrodes 124 and 128, respectively, at a time $t_1$.

Assuming that the voltage developed across the silicon controlled rectifier 116 is of a polarity as indicated, the silicon controlled rectifier 116 is triggered. Due to the timing provided by the resistor 180 and the capacitor 160 the silicon controlled rectifier 116 triggers at a quarter-wave point of the alternating current input signal. Thus, a current signal is passed through the silicon controlled rectifier 116 to the motor armature 76 during the remaining quarter-wave of the alternating current input signal. The polarity of the voltage developed across the silicon controlled rectifier 116 then reverses to back bias the silicon controlled rectifier 116 causing it to return to its normally open state.

So long as the OR 162 gate remains operated in response to light passing to or being blocked from the photo cells PC–B and PC–D, respectively, the capacitor 160 continues to charge, discharge and recharge to the predetermined voltage level to excite the unijunction transistor 144 at each quarter-cycle of the alternating current input signal. Thus, after time $t_1$ the capacitor 160 next charges to the predetermined voltage level just prior to the half-wave point $t_2$ of the alternating current input signal. Since the alternating current magnitude of the input signal is substantially zero at time $t_2$ the rectifiers 116 and 118 are not properly biased and the control signals thus do not effect a triggering thereof.

However, at a time $t_3$, which is the three-quarter wave point of the alternating current input signal, the capacitor 160 again excites the unijunction transistor 144 to develop the control signals. At the time $t_3$, the polarity of the voltage developed across the silicon controlled rectifier 118 is as indicated. Thus, a control signal applied to the control electrode 128 causes the silicon controlled rectifier 118 to switch to a conductive state to pass a unidirectional current through the motor armature 76. Thus, when light is passed to the photo cell PC–B or blocked from the photo cell PC–D, alternate half-cycles of a full wave rectified current signal are passed through the motor armature 76 as indicated in FIGURE 3(*c*). Such unidirectional current flow may be termed a "half-power" current flow since only half of a full wave rectified current signal is passed through the motor armature 76. The half-power current signal, in passing through the motor armature 76, develops a predetermined torque output which may be termed the half-power rotational output of the motor 60.

The direction of the half-power rotational output is, in turn, determined by the direction of unidirectional current flow through the armature 76 and depending upon the direction of rotation of the supply reel 10 either aids or opposes the rotation of the reel 10. In this manner the position of the end of the tape loop within the vacuum column 18 is moved toward the photo cell PC–C and hence toward the reference position.

If, in the operation of the tape transport, the photo cell PC–A is exposed to light or if light is blocked from the photo cell PC–E a current signal is developed at the input of the OR gate 166 which causes the OR gate to pass a current signal to the base 184 of the transistor 182. In response to the current signal from the OR gate 166 the transistor 182 switches to a non-conductive state to develop a high resistance at the collector 188. The diode 142 then is forward biased and current passes through the resistor 192 to charge the capacitor 160.

Since when the photo cell PC–A is exposed to light the photo cell PC–B is also exposed to light, and since, when light is blocked from the photo cell PC–E light is also blocked from the photo cell PC–D, when the OR gate 166 operates, the OR gate 162 has already operated. Thus, the current passing through the resistor 192 aids in charging the capacitor 160 and the time required to charge the capacitor becomes a function of a value of the resistors 180 and 192 in parallel with the capacitor 160. Since the resistors 180 and 192 are in parallel, the time required to charge the capacitor 160 is less than that required to charge the capacitor 160 through the resistor 180 alone. By selectively adjusting the value of the resistor 192, the charging time of the capacitor 160 may be reduced such that the charge on the capacitor 160 reaches the predetermined voltage level almost immediately after the voltage $+V_1$ is applied thereto by the operation of the OR gates 162 and 166. Thus, the unijunction transistor 144 is actuated as described above, at a rate which is substantially greater than that associated with the charging of the capacitor 160 through the resistor 180 alone.

In this manner, immediately after the voltage $+V_1$ is applied to the capacitor 160, the unijunction transistor 144 operates to develop control signals which are applied to the silicon controlled rectifiers 116 and 118. If the voltage $+V_1$ is applied to the capacitor 160 at a time $t_0$, and the voltage across the rectifier 116 is of the indicated polarity, the rectifier 116 is triggered at a time $t_4$ as indicated in FIGURE 3(*d*). The rectifier 116 remains conductive to pass the remainder of the half-wave of the input signal. During the period of time for which the rectifier 116 is conductive the capacitor 160 charges and discharges a number of times depending on the value of the charging time of the capacitor 160 to develop a series of control signals. Since the rectifier 116 is conductive, however, these control signals have no effect on the conductivity of the rectifiers.

At the time $t_2$ the polarity of the voltage developed across the silicon controlled rectifier is reversed, the silicon controlled rectifier 116 returns to its normally open state. When this occurs the capacitor 160 again begins to recharge. The capacitor 160 rapidly charges through the resistors 180 and 192 to the predetermined voltage level for which the unijunction transistor 144 is excited.

Thus, at a time $t_5$, momentarily after a completion of a half-cycle of the alternating input signal, control signals are again applied to the silicon controlled rectifiers 116 and 118. At the time $t_5$ the silicon controlled rectifier 118 is properly biased and is triggered by the control signal to pass a unidirectional current signal having a waveform substantially as indicated.

As illustrated in FIGURE 3(*d*), the unidirectional current signal which passes through the motor armature 76, when both the OR gates 162 and 166 are operated, substantially conforms to a full wave rectified signal version of the alternating input signal. Thus, a "full power" signal passes through the motor 60 to cause the motor to develop a full power rotational output. Depending upon the direction of the unidirectional current flow, the rotational output of the motor either aids or opposes the rotational motion of the reel 10 to selectively reposition the tape loop toward the photo cell PC–C.

Thus, as described, by automatically controlling the charging path for the capacitor 160 through the resistors 180 and 192 as the end of the tape loop passes through preselected increments of displacement from the reference position, as defined by a plurality of on-off type light detecting devices, the value of the charging time and periodicity of charging of the capacitor 160 are automatically controlled to vary in preselected steps as a function of displacement of the tape loop from the reference position. In this manner the timed generation of the control signals is controlled such that the rectifiers 116 and 118 are conductive for periods of time during alternate half-cycles of the alternating input signals which are also a function of the displacement of the tape loop from the reference position. Accordingly, the torque output of the motor 60 is selectively varied in preselected steps of half and full power to reposition the end of the tape loop adjacent to the and continuously with the range of positions about the reference position.

In addition to providing the voltage to charge the capacitor 160 as well as one voltage input to the unijunction transistor 144 the voltage $+V_1$, as previously mentioned, is in synchronism with the alternating input signal. Such synchronism of the voltage $+V_1$ provides means for maintaining control over the timing of the effective opening and closing of the rectifiers 116 and 118 at alternate quarter and half wave points of the alternating current input signal irrespective of the time at which the tape loop moves to initially expose the light to the individual photo cells PC–B and PC–A or to block light from the individual photo cells PC–D and PC–E. For example, if the OR gate 162 initially opens at a point in time after $t_0$ when the magnitude of the voltage $+V_1$ is already at its maximum the unijunction transistor 144 may initially be excited at a time other than at a quarter-wave point of the alternating input signal. However, due to the pulsating nature of the voltage $+V_1$, during the next charging time of the capacitor 160, the magnitude of the voltage $+V_1$ drops to zero causing the voltage applied to the anode electrode 148 of the unijunction transistor 144 to also drop substantially to zero. A sufficient voltage thus appears between the anode 148 and the base 146 to excite the transistor 144, thereby allowing the capacitor 160 to discharge through the transformer $T_2$ and develop control signals at the control electrodes of the rectifiers 116 and 118. Due to the synchronism of the voltage $+V_1$ with the input signal, however, when this occurs the A.C. magnitude of the input signal is also zero and the rectifiers 116 and 118 are not properly biased to be triggered by the control signals. The capacitor 160 then begins to recharge in synchronism with the alternating input signal at the time $t_2$. Thus, although the initial unidirectional current signal passing through the motor armature 76 may be of a shorter than a half-wave time duration, each subsequent unidirectional current has a waveform substantially as illustrated in FIGURE 3(*c*).

In summary then, the present invention, by including a plurality of separate light detecting devices physically aligned on one side of a tape loop opposite a light source, provides means for defining a single reference position for the end of the tape loop and a range of positions about the reference position for which no power is applied to the associated reel motor. This materially reduces motor wear, conserves on input power, and allows for automatic reversal of the direction of driving rotational output of the motor while the motor is de-energized. In addition, by coupling pairs of light detecting devices adjacent the reference position to separate control circuitry, means are provided for varying in steps the magnitude of unidirectional current signals passing through the reel motor as a function of incremental changes in the displacement of the end of the tape loop from the reference position. Such incremental or step-like control allows a simple gating circuit arrangement to be employed which represents a material reduction both in the complexity of circuit design and cost over the conventional servo control systems for tape transports.

In addition, since similar servo control systems are associated with both the supply and take-up reels 10 and 12, respectively, effective simultaneous control of the position of the tape loops within the vacuum columns 18 and 38, is provided. Thus, irrespective of stopping and starting as well as reversal of the direction of the tape, the position of the tape loops is maintained about the predetermined reference positions to prevent undesired tensioning and possible breakage of the tape.

What is claimed is:

1. Apparatus for controlling the position of a member relative to a reference position, comprising:
- a motor for developing a rotational output in response to a signal applied thereto;
- a member coupled to the motor for movement in a direction determined by the direction of the rotational output;
- input means for receiving an input signal;
- normally open switching means coupled between the motor and the input means;
- first position detecting means for detecting whether the member is to one side or the other of the reference position;
- means coupled to the motor and responsive to the first position detecting means for reversing the direction of the rotational output developed by the motor in response to the input signal;
- second position detecting means for detecting the displacement of the member from the reference position;
- and means coupled to the switching means and responsive to the second position detecting means for periodically closing the switching means for periods of time which are a function of the displacement of the member from the reference position.

2. The apparatus defined in claim 1 in which the switching means is arranged to pass unidirectional current signals to the motor.

3. Apparatus for controllng the position of a member relative to a reference position, comprising:
- a motor for developing a rotational output in response to an input signal applied thereto;
- means coupled to the motor for moving the member in a direction determined by the direction of the rotational output of the motor;
- input means for receiving an alternating current signal;
- normally open switching means coupled in series between the motor and the input means and responsive to a control signal to pass the input signal through the motor;
- a light source positioned on one side of the moving member;
- a plurality of separate light detecting means physically aligned on an opposite side of the member such that the member, in moving between the light source and the light detecting means, blocks light from successive ones of the light detecting means;
- means responsive to a predetermined one of the light detecting means for reversing the direction of the rotational output of the motor in response to the input signal;
- and means responsive to light striking light detecting means on a first side of the predetermined light detecting means or light being blocked from light detecting means on a second side of the predetermined light detecting means for developing the control signal at predetermined times during each cycle of the alternating current signal.

4. The apparatus defined in claim 3 including means for varying the predetermined times during each cycle of the alternating current signal for which the control signal is developed as a function of the number of light detecting means on the first side which receive light from the light source and the number of light detecting means on the second side which are blocked from receiving light.

5. Apparatus for controlling the position of a member relative to a reference position, comprising:
- a motor for developing a rotational output, the direction of which is determined by the direction of unidirectional current flow through the motor;
- means coupled to the motor for moving the member in a direction determined by the direction of the rotational output;

input means for receiving an alternating current input signal;
normally open switching means coupled in series between the input means and the motor for passing a unidirectinal current signal to the motor in response to a control signal applied thereto;
first position detecting means for detecting whether the member is to one side or the other of the reference position;
means responsive to the first position detecting means for reversing the direction of unidirectional current flow through the motor;
second position detecting means for detecting displacement of the member from the reference position;
normally non-conductive control means having a predetermined threshold of conduction and a pair of input terminals, the control means being arranged to generate the control signal when a voltage of a predetermined value is developed between the input terminals;
a capacitor coupled to one input terminal of the control means;
means coupled to the input means for developing an amplitude-limited alternating unidirectional voltage signal in synchronism with the input signal;
means for applying the voltage signal to the other input terminal of the control means;
normally closed switching means short circuiting the capacitor;
means responsive to the second position detecting means for opening the normally closed switching means to apply a charging voltage to the capacitor to develop the predetermined voltage across the input terminals of the control means;
and means for rapidly discharging the capacitor when the control means is conductive such that control signals are developed at predetermined times during each half-cycle of the input signal for which the normally closed switching means is open.

6. The apparatus defined in claim 5 including means coupled to the capacitor for changing the predetermined time during each half-cycle of the input signal at which the control signals are generated as a function of the displacement of the member from the reference position.

7. Apparatus for selectively positioning a member relative to a reference position, comprising:
a motor for developing a rotational output, the direction of which is determined by the direction of unidirectional current flow through the motor;
means coupled to the motor for moving the member in a direction determined by the direction of the rotational output of the motor;
input means for receiving an alternating current signal;
normally open switching means connected in series between the motor and the input means for passing a unidirectional current signal to the motor in response to a control signal applied to the switching means;
a light source positioned on one side of the member;
a plurality of separate light detecting means physically aligned on an opposite side of the member such that the member in moving in one direction between the light source and the light detecting means blocks light from successive ones of the light detecting means;
means coupled to a predetermined one of a light detecting means for reversing the direction of the unidirectional current flow through the motor;
normally non-conductive control means having a predetermined threshold of conduction and a pair of input terminals, the control means being arranged to generate the control signal when a voltage of a predetermined value is developed between the input terminals;
a capacitor coupled to one input terminal of the control means;
means for developing an amplitude-limited alternating unidirectional voltage signal having a frequency equal to twice that of the input signal;
means for applying the voltage signal to the other input terminal of the control means;
means responsive to light striking a light detecting means on one side of the predetermined light detecting means or being blocked from a light detecting means on an opposite side of the predetermined light detecting means for applying a charging voltage to the capacitor to develop the predetermined voltage across the input terminals of the control means;
and means for rapidly discharging the capacitor when the control means is conductive.

8. The apparatus defined in claim 7 including means for varying the charging rate of the capacitor in discreet steps with incremental changes in the displacement of the member from the predetermined light detecting means.

9. The apparatus defined in claim 7 wherein the means responsive to a light detecting means on one side of the predetermined detecting means includes a normally closed switch short circuiting the capacitor and a source of voltage signals connected to the capacitor.

10. A servo system, comprising:
a length of flexible material;
means for passing the material in a loop adjacent to a reference position;
drive means for longitudinally driving the material past the reference position;
a motor for developing a rotational output, the direction of which is determined by the direction of unidirectional current flow through the motor;
means for coupling the motor to the material to aid or oppose the movement of the material by the drive means depending upon the direction of unidirectional current flow through the motor;
input means for receiving an alternating current signal;
normally open unidirectional current conductive switching means coupled in series between the motor and the input means;
first position detecting means for detecting whether the end of the loop is on one side or the other of the reference position;
means coupled to the motor and responsive to the first position detecting means for reversing the direction of unidirectional current flow through the motor;
second position detecting means for detecting the displacement of the loop from the reference position;
and means coupled to the switching means and responsive to the second position detecting means for periodically closing the switching means for periods of time which are a function of the displacement of the end of the loop from the reference position.

11. A reel servo control system for controlling the position of the end of a loop of a longitudinally moving flexible material relative to a reference position, comprising:
a reel having a length of flexible material wound thereon;
means for directing the material from the reel to form a loop;
means for longitudinally driving the material to cause the reel to rotate;
a light source positioned on one side of the loop;
a plurality of separate light detecting means physically aligned on an opposite side of the loop such that the material, in moving, causes the end of the loop to move in a plane substantially parallel with the light source;
a motor for developing a rotational output, the direction of which is determined by the direction of unidirectional current flow through the motor;

means for coupling the motor to the reel to drive the reel in a direction determined by the direction of the rotational output of the motor;

input means for receiving an alternating current input signal;

normally open switching means coupled in series between the motor and the input means for passing a unidirectional current through the motor in response to a control signal applied thereto;

means for developing the control signal;

means responsive to a predetermined one of the light detecting means for reversing the direction of unidirectional current flow through the motor;

and means responsive to light striking a light detecting means positioned to one side of the predetermined light detecting means or light being blocked from a light detecting means positioned on an opposite side of the predetermined light detecting means for activating the means for developing the control signal at a predetermined time during each half-cycle of the input signal.

12. A reel servo control system for controlling the position of the end of a loop of longitudinally moving flexible material relative to a reference position, comprising:

a reel having a flexible material wound around;

means for directing the material from the reel to form a loop;

means for longitudinally driving the material to cause the reel to rotate;

a motor for developing a rotational output, the direction of which is determined by the direction of the unidirectional current flow through the motor;

means for coupling the motor to the reel for driving the reel in the direction determined by the rotational output of the motor;

input means for receiving an alternating current input signal;

normally open switching means coupled in series between the motor and the input means for passing a unidirectional current through the motor in response to a control signal applied thereto;

first position detecting means for detecting whether the end of the loop is to one side or the other of the reference position;

means responsive to the first position detecting means for reversing the direction of unidirectional current flow through the motor;

a second position detecting means for detecing displacement of the end of the loop beyond a predetermined range of positions about the reference position;

normally non-conductive control means having a predetermined threshold of conduction and a pair of input terminals for generating the control signal when a voltage of a predetermined value is developed across the pair of input terminals;

a capacitor coupled to one input terminal of the control means;

means for developing an amplitude-limited alternating interdirectional voltage signal having a frequency equal to twice that of the alternating input signal;

means for applying the voltage signal to the other input terminal of the control means;

means responsive to the second position detecting means for applying a charging voltage to the capacitor to develop the predetermined voltage across the terminals of the control means;

means for rapidly discharging the capacitor when the control means is conductive such that control signals are developed at predetermined times during each half-cycle of the input signal for which the charging voltage is applied to the capacitor.

13. The apparatus defined in claim 12 including means for varying the charging rate of the capacitor in discreet steps with incremental changes in the displacement of the end of the loop from the predetermined range of positions about the reference position.

14. The apparatus defined in claim 12 wherein the means responsive to the second position detecting means includes a normally closed switch short circuiting the capacitor and a voltage source connected to the capacitor.

15. A reel servo control system for controlling the position of an end of a loop of a longitudinally moving flexible material relative to a reference position, comprising:

a reel having a flexible material wound thereon;

means for directing the material from the reel to form a loop;

means for longitudinally driving the material to cause the reel to rotate;

a light source position on one side of the loop;

a plurality of separate light detecting means physically aligned on an opposite side of the loop such that the material in longitudinally moving causes the loop to tend to move in a plane substantially parallel with the light source;

a motor for developing a rotational output, the direction of which is determined by the direction of unidirectional current flow through the motor;

means for coupling the motor to the reel to drive the reel in a direction determined by the direction of the rotational output of the motor;

input means for receiving an alternating current input signal;

normally open switching means coupled in series between the motor and the input means for passing a unidirectional current through the motor in response to a control signal applied thereto;

means coupled to a predetermined one of the light detecting means for reversing the direction of unidirectional current flow through the motor;

normally non-conductive control means having a predetermined threshold of conduction and a pair of input terminals for generating the control signal when a voltage of a predetermined value is developed between the input terminals of the control means;

a capacitor coupled to one input terminal of the control means;

means for developing an amplitude-limited alternating interdirectional voltage signal having a frequency equal to twice that of the input signal;

means for applying the voltage signal to the other input terminal of the control means;

means responsive to light striking a light detecting means on one side of the predetermined light detecting means or being blocked from a light detecting means on an opposite side of the predetermined light detecting means for applying a charging voltage to the capacitor to develop the predetermined voltage across the input terminals of the control means;

and means for rapidly discharging the capacitor when the control means is conductive.

16. The apparatus defined in claim 15 including means for varying the charging rate of the capacitor in discreet steps with incremental changes in displacement in the end of the loop from the predetermined light detecting means.

References Cited by the Examiner

UNITED STATES PATENTS

| | | | |
|---|---|---|---|
| 2,147,421 | 2/39 | Bendz | 226—42 |
| 2,422,651 | 6/47 | Ayers. | |
| 2,778,634 | 1/57 | Gams et al. | 242—55.12 X |
| 2,952,415 | 9/60 | Gilson | 242—55.12 |

FOREIGN PATENTS

| | | |
|---|---|---|
| 833,549 | 4/60 | Great Britain. |

MERVIN STEIN, *Primary Examiner.*